United States Patent
Rastegar

(10) Patent No.: US 11,784,323 B2
(45) Date of Patent: Oct. 10, 2023

(54) EXOTHERMIC-BASED COMPOSITE STRUCTURES

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 17/103,582

(22) Filed: Nov. 24, 2020

(65) Prior Publication Data

US 2021/0159513 A1 May 27, 2021

Related U.S. Application Data

(60) Provisional application No. 62/940,193, filed on Nov. 25, 2019.

(51) Int. Cl.
*H01M 6/36* (2006.01)
*F28D 20/00* (2006.01)
*H01M 6/50* (2006.01)
*H01M 50/10* (2021.01)

(52) U.S. Cl.
CPC ............ *H01M 6/36* (2013.01); *F28D 20/003* (2013.01); *H01M 6/5038* (2013.01); *H01M 50/10* (2021.01); *F28D 2020/0078* (2013.01); *H01M 2220/30* (2013.01)

(58) Field of Classification Search
CPC .......... F28D 20/003; F28D 2020/0078; H01M 6/36; H01M 6/5038; H01M 50/10; H01M 2220/30
See application file for complete search history.

(56) References Cited

U.S. PATENT DOCUMENTS

| 2002/0035945 | A1* | 3/2002 | Knowlton | F42B 3/103 |
| | | | | 102/275.3 |
| 2012/0301754 | A1* | 11/2012 | Rastegar | H01M 6/36 |
| | | | | 429/52 |
| 2014/0013983 | A1* | 1/2014 | Rastegar | H01M 6/38 |
| | | | | 102/216 |

(Continued)

FOREIGN PATENT DOCUMENTS

WO WO-2017042504 A1 * 3/2017 ............... F28F 9/013

OTHER PUBLICATIONS

Machine translation of specification of WO2017/042504A1 (Year: 2017).*

*Primary Examiner* — William E McClain
*Assistant Examiner* — Jason Barton

(57) ABSTRACT

A thermal battery including: a battery core; and a load-bearing structure at least partially surrounding the battery core. The load-bearing structure including: a plurality of tubes arranged adjacent to one another and connected to at least one adjacent tube of the plurality of tubes; and an exothermic material disposed in the plurality of tubes. The load-bearing structure can include one or more initiation devices for initiating the exothermic material. The plurality of tubes can be compressed in a cross-section to compact the exothermic material disposed on the plurality of tubes. A thermal isolation material can also be disposed at one or more ends of the plurality of tubes.

7 Claims, 5 Drawing Sheets

(56) References Cited

U.S. PATENT DOCUMENTS

2015/0147601 A1\* 5/2015 Rastegar ............... H01M 50/70
  429/48
2018/0013152 A1\* 1/2018 Rastegar ............... F42C 11/008
2019/0017795 A1\* 1/2019 Shaw ........................ C06C 5/00

\* cited by examiner

EXOTHERMIC-BASED COMPOSITE STRUCTURES

CROSS REFERENCE TO RELATED APPLICATIONS

This application claims benefit to U.S. Provisional Application No. 62/940,193 filed on Nov. 25, 2019, the contents of which is incorporated herein by reference.

BACKGROUND

1. Field

The present disclosure is directed to exothermic-based composite structures and more particularly to exothermic-based composite structures for use in liquid reserve batteries batteries and even more particularly, to such liquid reserve batteries for use in munitions.

2. Prior Art

Munitions can be hand emplaced or gun launched. Munitions may be stored for up to 20 years in different environments, including at very low temperatures. In all situations, munition components need to be fully operational at temperatures that may be as low as −55 degrees C. Proper operation of munition components, particularly for munition reserve power systems, is critical to all missions at such low temperatures. For example, when munitions are launched at very low temperatures or are emplaced and must be operational at such low temperatures, methods to heat their reserve power system components quickly to allow their activation and to make them fully operational becomes critical. In addition, many sensitive sensory systems and their electronics do not function within the required range at very low temperatures.

Different methods of heating various mechanical, electrical, electronic and optical components at very low temperatures, such as in space or in very cold environments have been developed. In almost all such applications, electrical energy is the main source of heat and is also used to keep the source of electrical energy itself warm and operational. When the source of electrical energy is combustion of fuel, the waste heat is also used for keeping the system components at operational temperature.

The above methods, however, are not suitable for munitions for several reasons. Firstly, munitions are not generally provided with external power sources that can be used to heat the onboard components at low temperatures before firing. In addition, such heating processes are not suitable for munitions since they would take a relatively long time and munitions must be readied for firing very rapidly. Secondly, the added heating components such as electrical heating components with the required wiring and electrical insulations and support structures would occupy a significant amount of valuable munitions volume, thereby significantly degrading their effectiveness and lethality.

SUMMARY

An objective is to provide exothermic-based composite structures that are load bearing and possess sufficient mechanical properties to withstand setback launch accelerations of up to 75,000 Gs and high spin rates of up to 200 Hz and their generated forces in gun-fired munitions and to provide adaptive heating on-demand for thermal management of munitions components, such as power sources at low temperatures so as to significantly extend the run-time and high-pulsed power of reserve power systems for gun-fired munitions and extend the stand-off range, thus improving safety for soldiers.

The exothermic-based composite structures disclosed herein are load carrying and can be configured to withstand gun firing and flight spin induced forces to eliminate the need for support and shock hardening structures and elements. For such applications, exothermic materials are used as a heating source due to their high heat generating capacity and very fast response even at temperatures as low as −55 degrees C.

The exothermic-based composite structures can be configured to function as "heating blankets" for temperature sensitive components, such as power sources, which after exhausting their heating sources, would function as effective thermal insulation to keep the components warm at low temperatures.

A variation of the exothermic-based composite structures can employ phase change members in its structure to efficiently store heat energy that is generated by high temperature burning of pyrotechnics materials to provide a relatively uniform heating source at a predictable temperature that is significantly lower than peak pyrotechnic burning temperatures and that can be maintained significantly longer.

The occurrence of low temperatures in an operational environment is not predictable and for applications such as in emplaced munitions that have to be operational over a 30 day period, low temperatures that affect the munitions power system and other temperature sensitive components may occur at different times and last different amounts of time. For this reason, the exothermic-based composite structures can adaptively provide the required amount of heat on demand for thermal management of munitions components such as power sources at low temperatures.

Similar activation at low temperatures and high-power pulses can be provided to reserve power systems and temperature sensitive components of all gun-fired munitions, rockets and missiles at very low temperatures.

The adaptive heating capability of the load carrying exothermic-based composite structures can achieve the objective of significantly extending the run-time and high-pulsed power of reserve power systems for gun-fired munitions and extend the stand-off range without sacrificing munitions lethality, thus improving safety for soldiers.

Performance characteristics of the exothermic-based composite structures with adaptive heating on demand capabilities include:

1. The exothermic-based composite structure can be load bearing and possess sufficient mechanical properties to withstand setback launch and spin generated forces in gun-fired munitions, an therefore, do not require additional munitions volume to perform their adaptive heating of reserve power sources and other low temperature sensitive components of munitions on demand.

2. The exothermic-based composite structures can be configured to provide adaptive heating on-demand for thermal management of munitions components, such as reserve power sources and other temperature sensitive components, at low temperatures that may be as low as −55 degrees C.

3. The exothermic-based composite structures may be configured with phase change members to efficiently store heat energy that is generated by high temperature burning of pyrotechnic materials to provide a relatively uniform heating source at a predictable temperature that is significantly lower than peak pyrotechnic burning temperatures and that can be maintained significantly longer.

4. Since the occurrence of low temperatures in an operational environment is not predictable, particularly for munitions that are operational for many days, such as emplaced munitions that have to be operational over a 30 days period, the exothermic-based composite structures can be configured to be capable of adaptively providing the required amount of heat on demand to achieve the desired thermal management goals of the munitions components as it is subjected to the effects of low temperatures.

5. The exothermic-based composite structure can be provided with sensory and activation mechanisms to achieve the capability of adaptively providing heat to the components that their performance is on the verge of being negatively affected due to low temperature.

6. The exothermic-based composite structures can be used to rapidly heat reserve power sources at low temperatures to bring them to their peak operational capabilities to provide high-power pulses on demand.

7. The exothermic-based composite structures can be configured in any desired shape and size to adapt to the available volume and shape of the reserve power sources to optimize their thermal management functionality in terms of maximizing the run-time of performance level of the power sources.

8. By providing load bearing exothermic-based composite structures, the need for additional support structures and means of shock loading hardening may be eliminated or at least reduced. Thereby, additional valuable munitions volume does not need to be occupied.

9. The exothermic-based composite structure can also be fabricated as flexible members, for example, in the form of fabric like sheets, plates, bars, relatively thin fibers, etc., that could conform to the target component geometry and also provide the required distribution of the heating source to achieve optimal system performance.

The use of exothermal materials, such as pyrotechnic materials, that can rapidly provide heat or materials that undergo slower chemical reaction and thereby provide heat at much slower rates are used in munitions for providing heat at the required rate to various munitions components. Such exothermal materials are used as a heat source for munitions since they can heat the intended component very rapidly; they are for one-time use and for a relatively short period of time; and they can be activated without requiring outside power.

The exothermic-based composite structure can perform their intended heating of the munition temperature sensitive components adaptively and on demand at low temperatures to ensure their optimal performance.

The exothermic-based composite structure can be configured to be load bearing and possess the necessary mechanical properties to withstand setback launch and spin generated forces in gun-fired munitions so that no additional munitions volume is needed to be occupied.

The exothermic-based composite structure can be used for adaptive heating on-demand for thermal management of munitions reserve power sources and other temperature sensitive components at low temperatures that may be as low as −55 degrees C.

The exothermic-based composite structure can be used for the configuration of reserve power system assembly of hand emplaced munitions systems to make it possible to activate the munitions at very low temperatures and provide the required high-power pulses during individual missions. The same can be similarly used for activation at low temperatures and high-power pulses in gun-fired munitions, rockets and missiles at very low temperatures.

The exothermic-based composite structure can also be fabricated as flexible members, for example, in the form of fabric like sheets, plates, bars, relatively thin fibers, etc., that can conform to the target component and available geometry and also provide the required distribution of the heating source to achieve optimal system performance.

The exothermic-based composite structure can be configured with structures and materials that turns them into very effective thermal insulation materials following heat generation function.

The exothermic-based composite structures can support miniaturization of munitions electronics and munitions power sources and can provide managed and controlled heat rates.

The exothermic-based composite structures can withstand setback accelerations of over 75,000 Gs and high spin rates of up to 200 Hz and satisfy the military shelf life requirement of 20 years.

In addition, since the exothermic-based structures can be used for thermal management of temperature sensitive components of munitions, such as their power sources, the composite structure can have very low thermal conductivity. In addition, the exothermic materials used in construction of the composite structure can have low thermal conductivity before and after it has performed its heat generating function.

In addition, the exothermic heating sources can be distributed within the developed composite structure and can be initiated as needed to achieve the desired, i.e., to function as an adaptive thermal management system.

The occurrence of low temperatures in an operational environment is not predictable and for applications, such as in emplaced munitions that have to be operational over a 30 days period, low temperatures that affect the munitions power system and other temperature sensitive components may occur at different times and last different amounts of time. Therefore, the exothermic-based composite structures can be provided with sensory devices, such as, passive sensory devices, that would make the composite structure capable of adaptively providing the required amount of heat to the affected devices, such as the power sources for their thermal management and when high-power pulses are needed at low temperatures.

Highly effective thermal insulation materials can be used in power sources such as thermal batteries that operate at temperatures that can be over 600 degrees C. For example, an aerogel material, reinforced with ceramic fibers and particles. The insulation material may be relatively flexible sheets, such as, Fiberfrax Ceramic Fiber Paper, which are flexible enough to conform to smooth corners. In general, the flexible insulation materials can be fabricated into relatively thin sheets of even sub-millimeters. In the below description, a composite structure with several layers of multiple patterned pyrotechnic "strands" that can be initiated separately are described.

The composite structures can be configured to almost any size and shape to conform to the surface of the object to be covered. The composite structures can be relatively rigid for applications in which they have to bear load or may be relatively flexible for applications in which they must be "wrapped" around the intended object without requiring a significant load bearing capability.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

Flexible and Rigid Composite Structures with Patterned Pyrotechnic Layers

Figure 1:
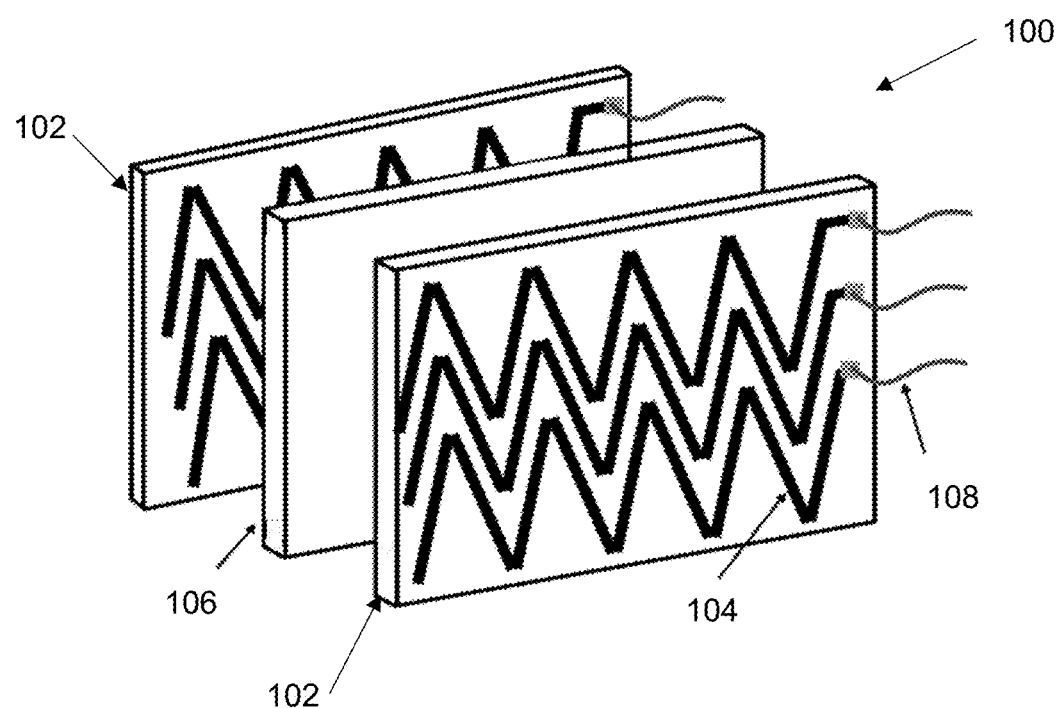
FIG. 1 illustrates a structure of one exothermic-based composite structure for thermal management of munitions components at low temperature.

The schematic of FIG. 1 shows a construction of an exothermic-based composite structure, generally referred to by reference numeral 100. Such composite structure can be flexible since such structures with patterned pyrotechnic layers can be fabricated as sheets or strips or the like for general application to the intended objects. However, the composite structure 100 can also be rigid and load bearing, as described below.

In the schematic of FIG. 1, the exothermic-based composite structure 100 comprises layers of high temperature insulation materials 102 within with patterns of pyrotechnic (or other exothermic material) strips inlays 104 that are separated by thin layers of insulation materials 106.

It is appreciated that strengthening high temperature resistant and low thermal conductivity fibers such as fiberglass may also be provided in the insulation layers 102 as well as the patterned pyrotechnic strip inlays 104 to provide structural strength to the composite structure without adding extra weight.

The patterned pyrotechnic strip inlays 104 are provided with separate initiation bridge-wires 108 or several strip inlays may be connected at the ends or at intermediate points along their lengths to be initiated with a single initiation bridge-wire. Methods that can be used for initiating the patterned pyrotechnic strips, such as the use of bride-wires that are heated electrically, are well known for use in munitions.

The pyrotechnic strip inlays 104 may be prefabricated as a flexible fuse and may be woven into a fibrous insulation layer such as fiberglass or the like. Alternatively, the patterned pyrotechnic strips 104 may be cut out of the insulation layers and the fuse strips (flexible or preformed rigid fuse strip patterns as described in Sections (b)-(d) below) may be inlaid into the provided gaps. When using preformed rigid fuse strip patterns of the type described below, the fuse strips may be laid down as desired on a flat surface and the space between them filled with insulation material particles (or to be dried pasted) to form a flat layer. The layers 102 may be "assembled" directly over the thin insulation layers 106 to minimize or even eliminate the need for any bonding agent.

Figure 2:
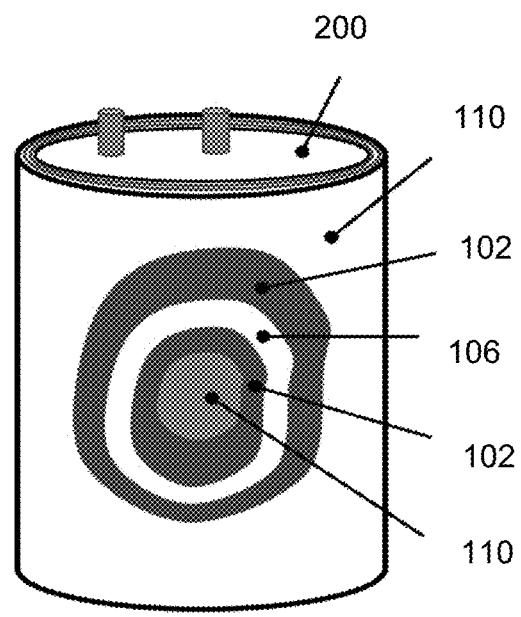
FIG. 2 illustrates an exothermic-based composite structure used for thermal management of a liquid reserve battery.

It is appreciated that the patterned pyrotechnic/exothermic strip inlaid layer 104 and the thin insulation layer 102 may be applied directly to an intended device, such as a liquid reserve battery housing 200, as shown in FIG. 2. In FIG. 2, two patterned pyrotechnic/exothermic strip inlaid layers 102 that are separated by a thin insulation layer 106 and covered by an outer insulation layer 110 are shown to cover the outer housing 112 of a liquid reserve battery 200. The provided patterned exothermic-based composite structure can also be part of the structure of the munition that houses the liquid reserve battery as described below.

It is also appreciated that the exothermic-based composite structure shown in FIGS. 1 and 2 can be provided with as many patterned pyrotechnic/exothermic material strip layers 102 as necessary to achieve the required thermal management goals and the available space of each application. In addition, the composite structure can be configured with insulation filling and insulation layers that are flexible, thereby allowing the fabricated composite sheets to be wrapped around devices and components that require heating on demand at low temperatures.

Figure 3:
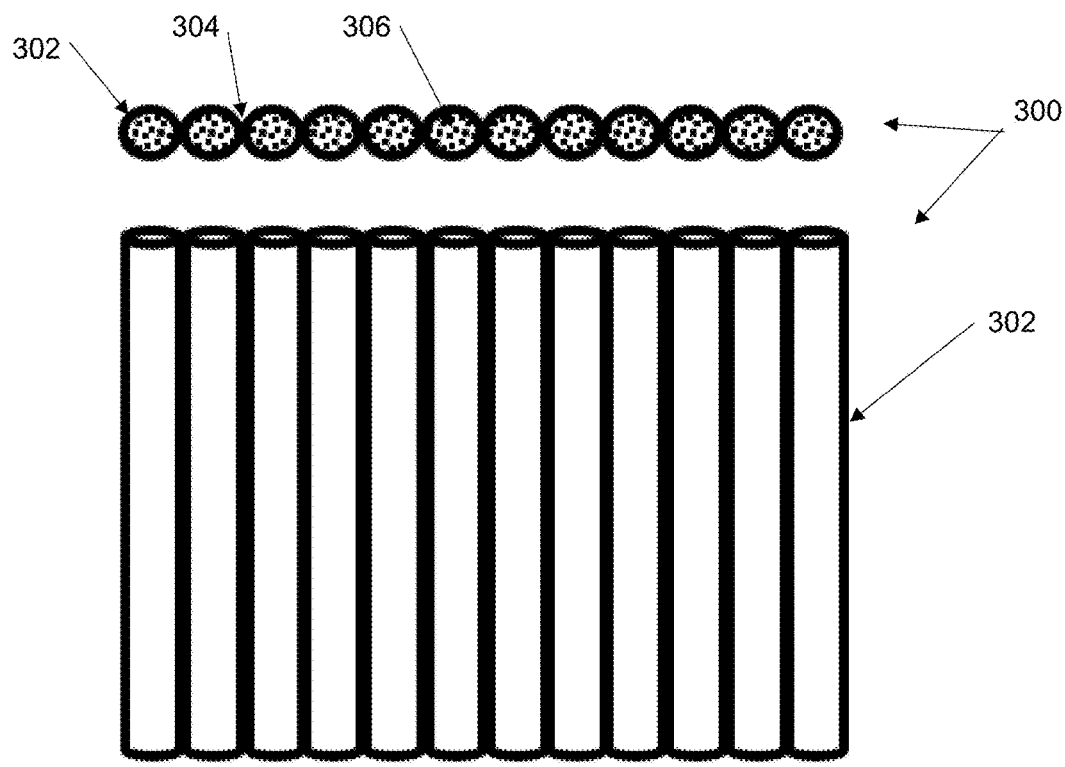
FIG. 3 illustrates a load-bearing exothermic-based composite structure for the construction of various devices with a thermal management heat source.

Rigid Load-Bearing Composite Structures with Pyrotechnic/Exothermic Material Heating Sources A load-bearing composite structures with embedded pyrotechnic/exothermic material heating sources that can be initiated on demand is shown in FIG. 3, generally referred to by reference numeral 300. This composite structure 300 can be used to build the structure of different devices or their support structures and even housing of reserve batteries to provide adaptive heating for their thermal management.

In the load-bearing composite structure of FIG. 3, the structure is shown to consist of relatively thin wall tubes 302 that are welded together side by side at a contact point 304 to form a strong but relatively lightweight plate. Then as can be seen in the top view of FIG. 3, the tubes are filled with compacted pyrotechnic compounds 306 that can be configured to the desired burn speed, temperature and generating heat.

In practice, the pyrotechnic materials 306 filling the tubes 302 can be consolidated. The process of consolidation for the composite structure of FIG. 3 is readily carried out by flattening the tubes 302 under a press. The process reduces the thickness of the composite plate 300 (e.g., reducing a diameter of the tubes 302 in one direction, such as in the direction in and out of the page of FIG. 3). Depending on the application at hand, each tube 302 may be filled with different pyrotechnic material 306. Each tube 302 may be provided with individual initiation mechanism (e.g., electrically heated bridge-wires) to achieve a desired heating pattern or a few may be initiated with a single initiator or all at the same time. The selection of the pyrotechnics can avoid sympathetic ignition.

Figure 4:
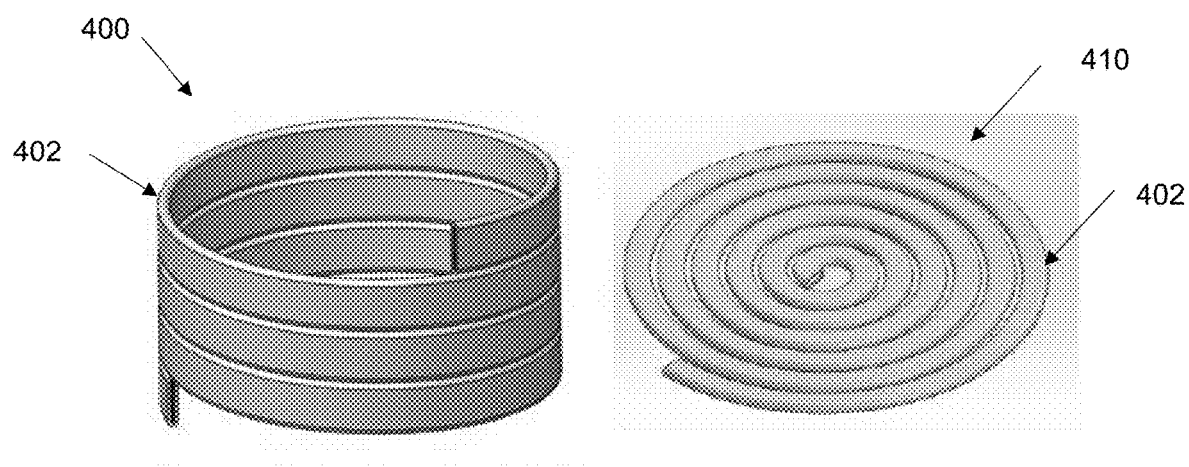
FIG. 4 illustrates embodiments of coil and spirally formed and flattened stainless steel tubes filed with slow burning pyrotechnic material to form heating fuze strips for thermal management of thermal batteries.

The tube(s) 402 can be configured as a slow burning heating fuse strip 400 that can be coiled to be positioned between thermal insulation layers around thermal battery core. The heating fuse strips 402 can be formed by packing slow burning (currently in the order of 3-15 seconds per inch) pyrotechnic material in a thin wall and 0.133 inch outside diameter stainless-steel tube(s) 402. The tube(s) 402 can then be flattened while being coiled to consolidate the pyrotechnic material and make them into a relatively thin wall cylinders to be positioned between thermal insulation layers around the thermal battery core. The top and bottom surfaces of the battery core can also be covered by flattened spiral fuse strips 410 made from the same stainless-steel tube(s) 402 and filled with slow burning pyrotechnic material. Examples of such coil 400 and spiral 410 heating fuse strips are shown in FIG. 4. The heating fuse strips 400, 410 can be integrated into thermal batteries to increase their run time by over one order of magnitude.

The pyrotechnic composite structure (plate) 300 of FIG. 3 can be used in the same process of consolidation described above by simultaneously or in several steps flattening the plate tubes, which although shown in a linear array, can be formed in any shape, such as cylindrical.

It is also appreciated that the initial tubes do not have to be straight and may have been formed into various shapes such as in arc forms or even bent to relatively sharp corners and stacked and welded using laser or electron beam or even brazed together to form the desired structures for various devices as their housing or support structures. The structures will be relatively lightweight and the presence of compacted pyrotechnic material inside the structure would increase damping characteristics of the structure and would make them highly suitable for damping ringing (stress waves) and structural vibration.

Example—1: Application of Rigid Load-Bearing Composite Structures with Pyrotechnic or Other Exothermic Material Heating Sources—Liquid Reserve Battery Thermal Manage As discussed above, the load-bearing composite structure 300 of FIG. 3 with the embedded pyrotechnic/exothermic material 306 as a heating source may also be configured in a variety of shapes. One application for such structure 300 is for munitions, more particularly, for thermal management of liquid reserve batteries used in munitions. Currently available liquid reserve batteries cannot be activated and once activated to operate at temperatures below −40 degrees C. and at temperatures below −10 to zero degrees C. the performance of such batteries degrades significantly. As described below, the proposed load-bearing pyrotechnic and/or other slow reacting exothermic material based composite structure can be readily adapted to address such shortcomings of currently available liquid reserve batteries.

Figures 5, 6:
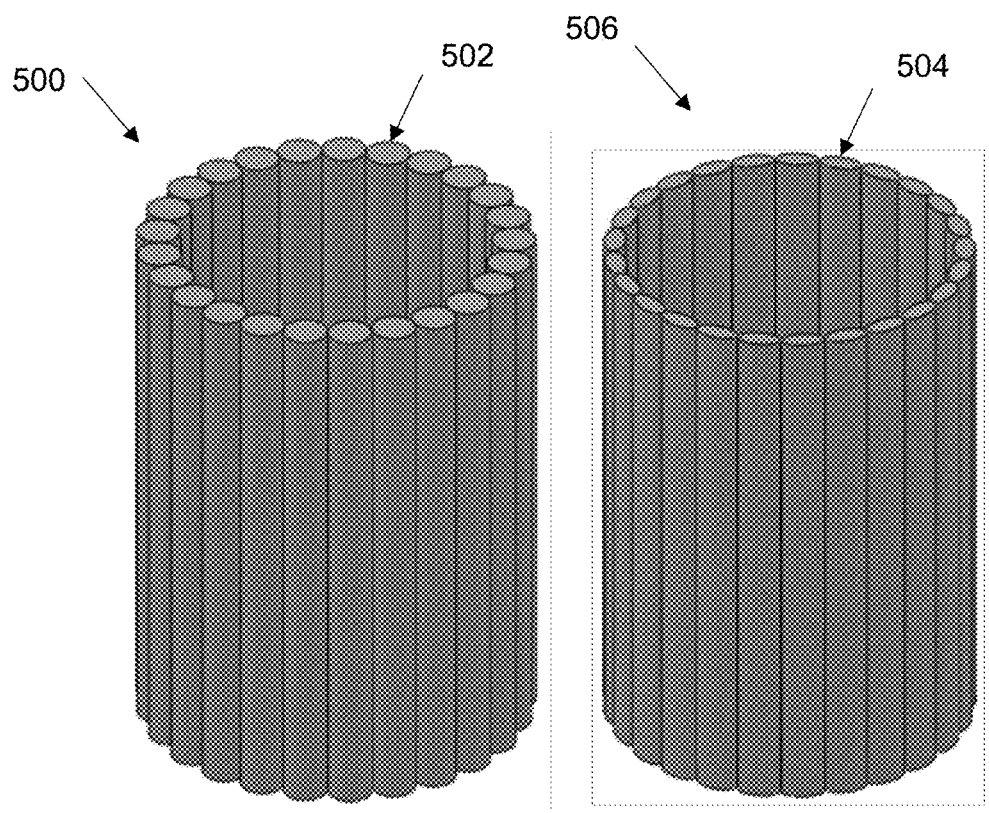
FIGS. 5 and 6 illustrate a cylindrical composite structure with embedded exothermic compound, before and after material compacting, respectively.

For thermal management of liquid reserve batteries, the battery housing may be constructed with a cylinder 500 of stainless-steel tubes 502 that are welded as described above to form a cylindrical shape as shown in FIG. 5. The individual stainless-steel tubes 502 can then be filled with the same or different pyrotechnic or other exothermic materials. The stainless-steel tubes 502 can alternatively be compacted to the shape 504 as shown in FIG. 6 to form the housing 506. The tube ends may then be provided with individual or grouped initiation bridge wires and sealed with a military grade natural cellulose (NC) or other similar compounds that are commonly used for sealing and protecting energetic materials from the environment.

The resulting sealed structures 500, 506 may then be used as the casing of liquid reserve batteries or as a sleeve disposed around the casing of liquid reserve batteries for thermal management, including rapid pre-heating as needed at low temperatures before activation. The outer surface of the structure 506 can also be provided with an appropriate thermal insulation layer to minimize heat loss into the environment. The pyrotechnic material filled tubes 504 may then be initiated to heat the liquid reserve battery as needed. For example, fast burning pyrotechnics may be used to rapidly heat the battery before activation at low temperatures or slower burning pyrotechnics or slow acting exothermic compounds may be used to keep the liquid reserve battery at its top performance level at low temperatures. Additionally, a select number of the pyrotechnic filled tubes can be have the fast burning pyrotechnics and a select number of tubes can have the slower burning pyrotechnics or slow acting exothermic compounds.

It is also appreciated that helically coiled and welded tube(s) similar to the coil 400 shown in FIG. 4 (left) may also be used for the above purpose, In this case, the helically coiled tube is first formed, then filled with pyrotechnic or other exothermic material and then flattened to compact the filling material and then used as was described above for thermal management of liquid reserve batteries. A double helix tube can be used to form the coil 400 where a first helix tube can have the fast burning pyrotechnics and a second helix can have the slower burning pyrotechnics or slow acting exothermic compounds.

Example—2: Application of Rigid Load-Bearing Composite Structures with Pyrotechnic or Other Exothermic Material Heating Sources—Liquid Reserve Battery Housing As discussed above, alternatively, the cylindrical structures 500, 506 of FIG. 5 or FIG. 6 may be used to construct the actual housing/casing of a liquid reserve battery. In such a composite liquid reserve battery housing, housing caps can be welded to the housing 500, 506 after the housing tubes have been filled with pyrotechnic or other exothermic materials and alternatively, compacted without causing the compacted pyrotechnic materials to initiate.

Figure 7:
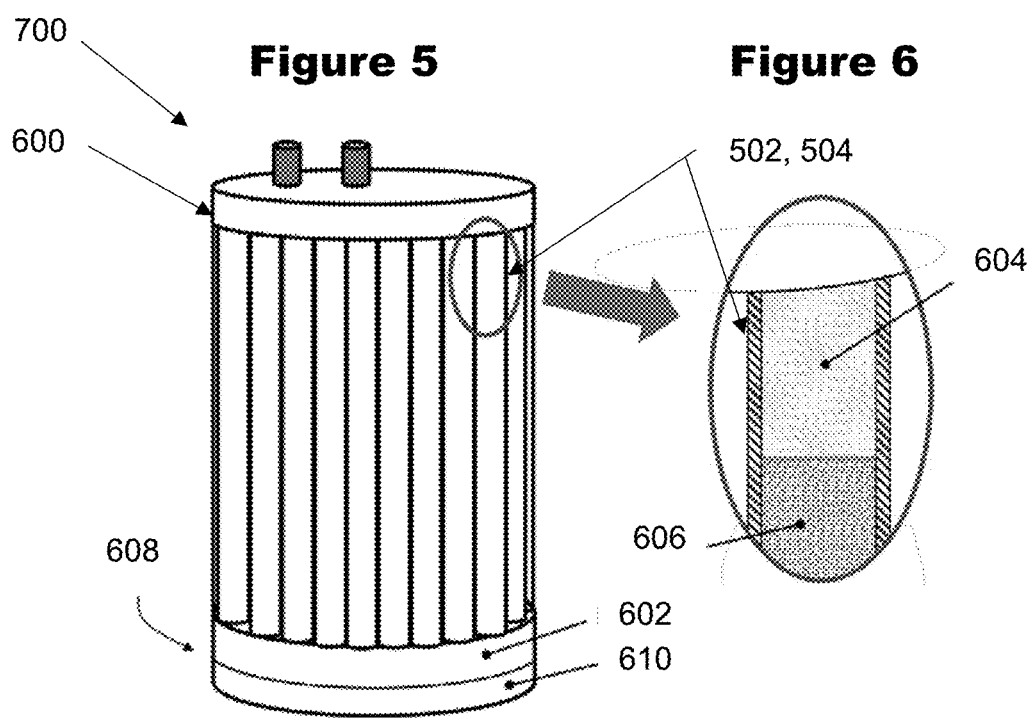
FIG. 7 illustrates a liquid reserve battery housing with a composite structure with embedded exothermic materials for fast activation and thermal management at low temperatures.

The configuration of such composite structure for liquid reserve battery housing and the process of its manufacture is described below. The configuration of the proposed composite structure for liquid reserve battery housing is shown in FIG. 7. In FIG. 7, on the battery terminal cap 600 side, a blow-up cutaway view of one of the sidewall tubes 502, 504 is shown. As can be seen in the blow-up view, the top portion of the pyrotechnic packed tubes 502, 504 is filled with a thermal isolation filling 604, such as alumina[1] as described below to ensure that while welding the top cap to the sidewall, the pyrotechnic filling 606 is not ignited.

[1] Developed as part of a U. S. Army SBIR Phase I and Phase II project, titled: "Novel Actuation Technologies for Guided Precision Munitions", contract number W15QKN-06-C-0016 for preventing sympathetic ignition of propellants in multistage thrusters.

It is noted that in the process of manufacturing liquid reserve batteries, the terminal cap end plate 600 is welded to the sidewall (cylinder 500, 506) as the last step, after all interior components of the battery have been assembled inside the battery housing. For this reason and noting that the common practice is to place thermal heat sinks around the sidewalls to minimize the transfer of heat down the sidewall during the welding process, the provided thermal isolation layer should prevent ignition of the pyrotechnic material during the welding process.

The process of constructing and assembling the battery and its housing with embedded pyrotechnic materials is as follows:

The sidewall 500, 506 of the liquid reserve battery housing is constructed with appropriately sized stainless-steel tubes 502, 504 as was earlier described as shown in FIG. 5. In FIG. 5, the sidewall of the housing is shown to have a cylindrical shape. However, it is appreciated that the sidewall may be configured to have almost any other shape, for example, it may be designed in rectangular or half-moon, oval or even triangular or compound shape to fit the available space in munitions.

The sidewall section 500, 506 is then welded (or brazed or the like) to the housing welded section 602. The housing welded section is provided with holes matching the bore of the tubes 502, 504, through which the internal volume of the tubes can later be accessed. It is noted that after the welding, the interior spaces of the tubes are no longer accessible from the inside of the housing.

Each sidewall tube is provided with the bridge-wire or other activation device on the housing welded section 602 and sealed. The housing welded section 602 is provided with an appropriately sized compartment 608 for housing the bridge-wire and its wirings, which are exited from the side of the housing welded section 602 (not shown in FIG. 7 for clarity) or through the bottom of the battery through an initiation compartment cap 610, depending on the application. The initiation compartment cap 610 is then attached to the housing welded section 602 by fasteners or screwed together or using any other commonly used method.

From their open ends, the sidewall tubes are filled with the selected pyrotechnic and/or other exothermic materials 606 to close (around 0.1-0.2 inch) to the end and compacted and the remaining space is filled with thermal isolation powder 604 (alumina or the like) as shown in the cutaway view of FIG. 7.

The sidewall tubes are alternatively "flattened" to consolidate the pyrotechnic material up to close to the bottom "housing welded section 602. This can be a cold forming processes in which the battery housing is positioned inside a solid holding fixture sized to the outside diameter of the battery housing. The holding fixture can then be turned in the forming machine while a forming roller travels in and out of the housing interior and progressively flattening the sidewall tubes. The top (thermal isolation side) of the sidewall tubes are welded closed The liquid reserve battery components are then assembled inside the battery housing 500, 506 and terminal wires are connected and the top cap 600 is welded to the battery housing 500, 506.

The liquid reserve battery 700 is then ready for use. In general, the battery can be provided with an outside layer of thermal insulation. The embedded pyrotechnic materials can then be initiated as needed, for example before activation and when a high power pulse is needed at low temperatures and for its thermal management.

Once the liquid reserve battery 700 is activated at low temperatures, the methodology described in U.S. Pat. No. 10,063,076, the entire contents of which is incorporated herein by reference, can be used to assist in thermal management of the battery. Such methodology uses electrical energy from the same battery to keep its electrolyte warm and at the desired temperature.

Other Rigid Load-Bearing Composite Structure Geometries with Pyrotechnic/Exothermic Material Heating Sources The rigid and load-bearing composite structures with embedded pyrotechnic and/or other exothermic compounds discussed above are shown to be constructed with stainless-steel tubes with circular cross-sections and/or materials. It is, however, appreciated that the composite structures may also be similarly constructed with tubes having other geometries, for example with rectangular tubes 802 or triangular tubes 804 or a combination of such tube cross-sections as shown in FIG. 8.

Figure 8:
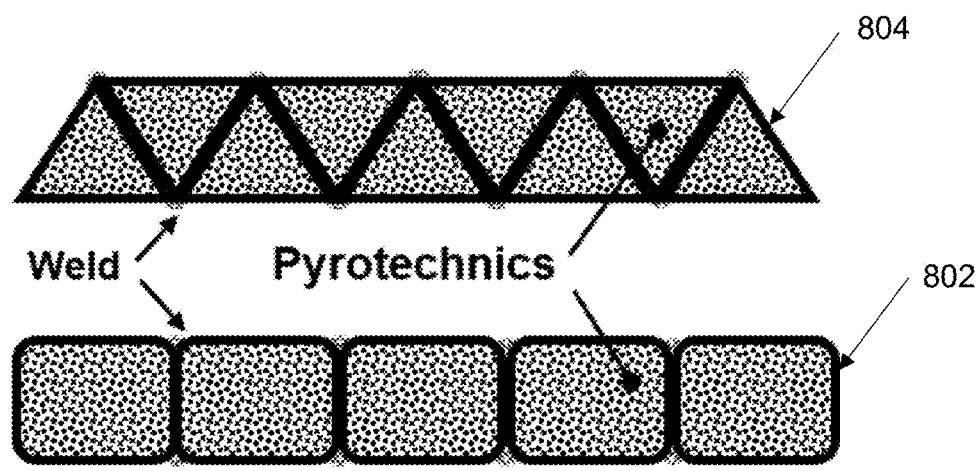
FIG. 8 illustrates cross-sectional views of composite plate structures with embedded pyrotechnics constructed with welded triangular (top) and rectangular (bottom) tubes.

Rigid Load-Bearing Composite Structure Constructed with Phase-Change Metals and Embedded Pyrotechnics for High Heat Capacity The load-bearing composite structures of FIGS. 3 and 8 are shown to be constructed with relatively thin-wall tubes that are welded together side by side to form a strong but relatively lightweight plate or as for the case of composite structures of FIGS. 5 and 6, cylindrical housings. As shown in FIG. 4, the tubes may also be formed in spiral or coiled shapes, which may be welded together to form strong load-bearing structures. The tubes are then filled with pyrotechnic or other exothermic material compounds that can be configured to be initiated to react at a desired speed, temperature and with a prescribed heat generating capacity. The pyrotechnic materials in the individual or groups of tubes can then be initiated adaptively and on-demand for the composite structure to perform its intended thermal management functions.

The thermal management capabilities of the load-bearing composite structures can be increased by using pyrotechnic or other exothermic materials with high heat generating capacity and which generally burn (undergo chemical reaction) slowly. Using such exothermic materials enables thermal management of intended devices over relatively long periods of time without an increase in the overall volume of the composite structure.

One challenge of using high heat generating pyrotechnics in composite structures is their slow burning at high temperatures. High temperature burning creates local high temperature regions and is not generally desirable since it can cause damage. For example, a high heat generating pyrotechnic material may burn at 1000-1200 degrees C., making it unsuitable for use in a composite housing of the liquid reserve battery of FIG. 7 since it may damage the battery core. In addition, to avoid sympathetic ignition of pyrotechnics in adjacent tubes, thermally isolating material (e.g., alumina) filled tubes may have to be positioned between pyrotechnic filled tubes.

Another challenge of using high heat generating pyrotechnics in composite structures in addition to the generated local high temperatures is the relatively rapid cooling of the region due to the generated high temperature gradient.

The pyrotechnic-based composite structures described below addresses both of such challenges of using high temperature and high heat generating pyrotechnics. The pyrotechnic-based composite structures use the process of phase change in which the pyrotechnic generated heat is used to melt an element (e.g., a relatively low melting temperature metal such as aluminum or zinc or tin) and thereby store heat energy in the molten material at a significantly lower temperature than those generated by the pyrotechnic material. The molten material would then slowly conduct the heat to the composite structure at the lower and constant melting temperature until the solidification process ends and the conduction of heat out of the solidified element begins to drop its temperature.

Figure 9:
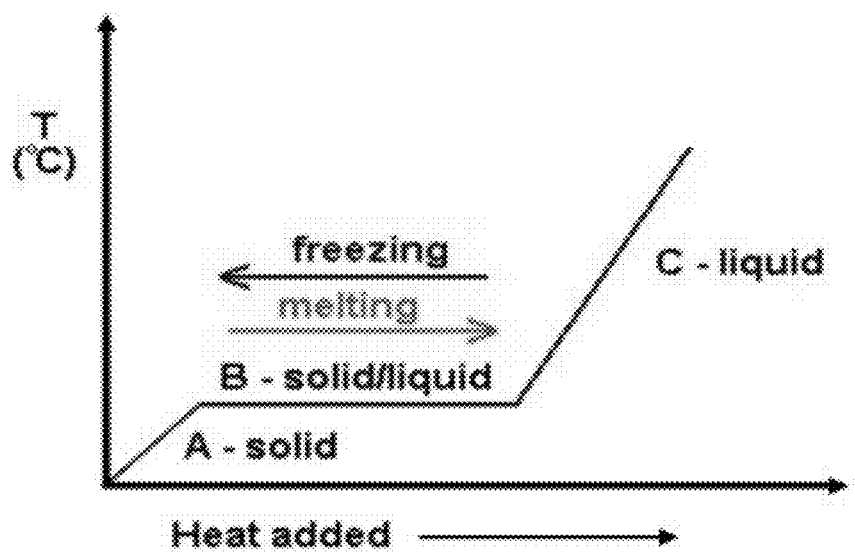
FIG. 9 illustrates a phase-change diagram for a typical substance.

The process of a solid becoming a liquid is called melting (sometimes fusion). The opposite process, a liquid becoming a solid, is called solidification. For any pure substance, the temperature at which melting occurs—the melting point—is a characteristic of that substance. It requires heat energy for a solid to melt into a liquid. During the melting process and as the mixture of solid and liquid is heated, the mixture temperature stays constant as shown in the phase change diagram of FIG. 9. Thereby heat energy is stored in the molten substance. The stored heat is then transferred to the surrounding structure via conduction at a constant (melting point) temperature until the substance has fully solidified. The opposite process is routinely used to keep beverages cool by the addition of ice that melts and keeps the beverage cool at 0 deg. C.

Every pure substance requires a certain amount of energy to change from a solid to a liquid. This amount is called the enthalpy of fusion (or heat of fusion) of the substance, represented as $\Delta H_{fus}$. For example, pure aluminum has a melting temperature of 660 degrees C. and its enthalpy of fusion is $\Delta H_{fus}=10.7$ KJ/mol. Note that the unit of $\Delta H_{fus}$ is kilojoules per mole, the quantity of material is needed to know how much energy is involved. The $\Delta H_{fus}$ is always tabulated as a positive number. However, it can be used for both the melting and the solidification processes (in exothermic solidification process, $\Delta H$ will be negative).

Figure 10:
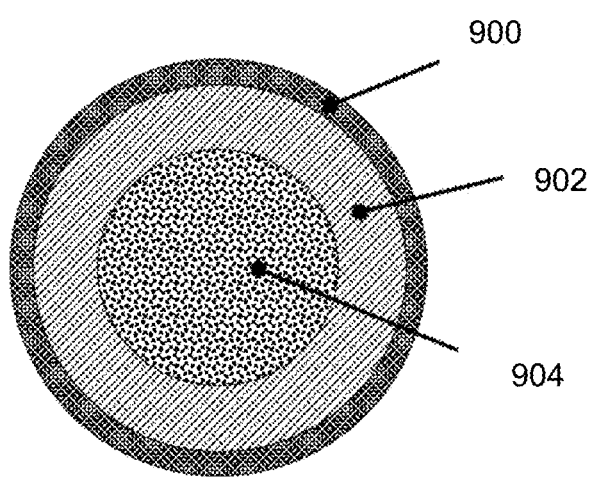
FIG. 10 illustrates a composite structure with phase changing member for heat storage at lower temperatures and for uniform heating in thermal management processes.

The composite structures presented above (e.g., those of FIGS. 5-8) may then be constructed with tubes 900 that are provided with the added phase changing material, such as for example aluminum or zinc or tin—that are melted during the high temperature burning of the pyrotechnic material 904 and thereby store the generated heat at lower temperatures. The cross-sectional view of such a simple composite tube structure is shown in FIG. 10, in which the pyrotechnic material 904 is provided inside a tube 902 formed of, e.g., aluminum, which is then encased in another tube 900 (e.g., formed of stainless-steel) with a significantly higher melting temperature than the material of tube 902 (e.g., aluminum). The composite tube of FIG. 10 may be welded as was previously described together even after pyrotechnic material filling with proper cooling process to any structural shape and flattened if necessary. The resulting composite structures can provide significantly more heat at significantly lower and more uniform temperature for thermal management of the intended devices.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A thermal battery comprising:
   a battery core; and
   one or more first substrates at least partially surrounding the battery core, the one or more first substrates having an exothermic material patterned in a surface of each of the one or more first substrates, the exothermic material being configured to generate heat to warm the battery core upon initiation of the exothermic material.

2. The thermal battery of claim 1, wherein the exothermic material is a pyrotechnic material.

3. The thermal battery of claim 2, wherein the one or more first substrates comprises first and second substrates, wherein the pyrotechnic material is patterned in the surface of each of the first and second substrates.

4. The thermal battery of claim 3, further comprising an insulating substrate layered between the first and second substrates.

5. The thermal battery of claim 3, wherein the one or more first substrates comprises a plurality of substrates, each having the pyrotechnic material patterned in the surface of the plurality of substrates; and
   further comprising an insulating substrate disposed between at least two adjacent substrates of the plurality of substrates.

6. The thermal battery of claim 2, further comprising a bridge wire for initiating the pyrotechnic material.

7. The thermal battery of claim 1, wherein the thermal battery is a liquid reserve battery.

* * * * *